United States Patent
Hellwig (10) Patent No.: US 12,547,562 B2
(45) Date of Patent: Feb. 10, 2026

(54) DISTRIBUTION OF INTERCONNECT BANDWIDTH AMONG MASTER AGENTS

(71) Applicant: Infineon Technologies AG, Neubiberg (DE)

(72) Inventor: Frank Hellwig, Wunstorf (DE)

(73) Assignee: Infineon Technologies AG, Neubiberg (DE)

( * ) Notice: Subject to any disclaimer, the term of this patent is extended or adjusted under 35 U.S.C. 154(b) by 417 days.

(21) Appl. No.: 16/811,081

(22) Filed: Mar. 6, 2020

(65) Prior Publication Data

US 2021/0279192 A1    Sep. 9, 2021

(51) Int. Cl.
| | |
|---|---|
| G06F 13/20 | (2006.01) |
| G06F 11/30 | (2006.01) |
| G06F 11/34 | (2006.01) |
| G06F 13/40 | (2006.01) |

(52) U.S. Cl.
CPC .......... *G06F 13/20* (2013.01); *G06F 11/3041* (2013.01); *G06F 11/349* (2013.01); *G06F 13/4027* (2013.01)

(58) Field of Classification Search
CPC .... G06F 13/20; G06F 11/3041; G06F 11/349; G06F 13/4027; G06F 11/3433; G06F 2201/88
USPC ........................................................... 710/6
See application file for complete search history.

(56) References Cited

U.S. PATENT DOCUMENTS

| | | | | |
|---|---|---|---|---|
| 5,241,632 | A  * | 8/1993 | O'Connell | G06F 13/364 |
| | | | | 710/117 |
| 6,934,871 | B2 * | 8/2005 | Day | G06F 13/36 |
| | | | | 713/502 |
| 7,558,197 | B1 * | 7/2009 | Sindhu | H04L 49/90 |
| | | | | 370/414 |
| 2004/0090974 | A1 * | 5/2004 | Balakrishnan | H04L 49/254 |
| | | | | 370/412 |
| 2005/0160188 | A1 * | 7/2005 | Bogin | G06F 13/161 |
| | | | | 710/1 |
| 2007/0002897 | A1 * | 1/2007 | Goshen | H04L 65/80 |
| | | | | 370/468 |
| 2007/0067531 | A1 * | 3/2007 | Kolinummi | G06F 13/372 |
| | | | | 710/111 |
| 2008/0192820 | A1 * | 8/2008 | Brooks | H04N 21/2385 |
| | | | | 348/E7.071 |

(Continued)

FOREIGN PATENT DOCUMENTS

| | | |
|---|---|---|
| JP | H11-184807 A | 7/1999 |
| JP | 2008-165547 A | 7/2008 |

(Continued)

*Primary Examiner* — Chun Kuan Lee
(74) *Attorney, Agent, or Firm* — Banner & Witcoff, Ltd.

(57) ABSTRACT

A method and apparatus for distributing interconnect bandwidth among master agents. The method includes allocating to each of the master agents a respective portion of the interconnect bandwidth within a time interval; monitoring the master agents to determine if any of the master agents has consumed its allocated portion of interconnect bandwidth within a current time interval; and if a master agent has consumed its allocated portion of interconnect bandwidth within the current time interval, delaying any new access requests from this master agent for a predetermined request delay time within the current time interval.

32 Claims, 5 Drawing Sheets

(56) References Cited

U.S. PATENT DOCUMENTS

2009/0006165 A1\* 1/2009 Teh .................. H04L 12/56
710/244
2017/0017412 A1\* 1/2017 Luan ................. G06F 3/064

FOREIGN PATENT DOCUMENTS

JP 2014-182727 A 9/2014
JP 2017-511545 A 4/2017

\* cited by examiner

200A
Data Processing Apparatus with Controller 220

300A
Data Processing Apparatus
with Controller 320

Figure 3B

DISTRIBUTION OF INTERCONNECT BANDWIDTH AMONG MASTER AGENTS

BACKGROUND

A multicore microcontroller can run multiple software applications in parallel. Conflicts between the applications may cause interconnect displacement. For example, when a first application accesses the interconnect often or accesses interconnect resources having high access latency, a second application requesting interconnect access may have to often wait often until the first application terminates its access. This can result in the processing of the second application being slowed, or the first application failing because it cannot execute in real time. Time-division multiplexing resolves displacement, but also slows the applications and reduces multicore microcontroller hardware utilization.

DETAILED DESCRIPTION

The present disclosure is directed to reducing interconnect conflicts generated by a master agent. Each master agent connected to an interconnect is allocated, within a time interval, an interconnect bandwidth during which the respective master agent may occupy the interconnect. If, within a current time interval, a master agent has reached its allocated bandwidth, then for the remainder of the time interval, this master agent is granted access with reduced bandwidth by ignoring each new access request from this master agent for a number of interconnect clock cycles before the new access request is considered for master agent arbitration.

Figure 1:
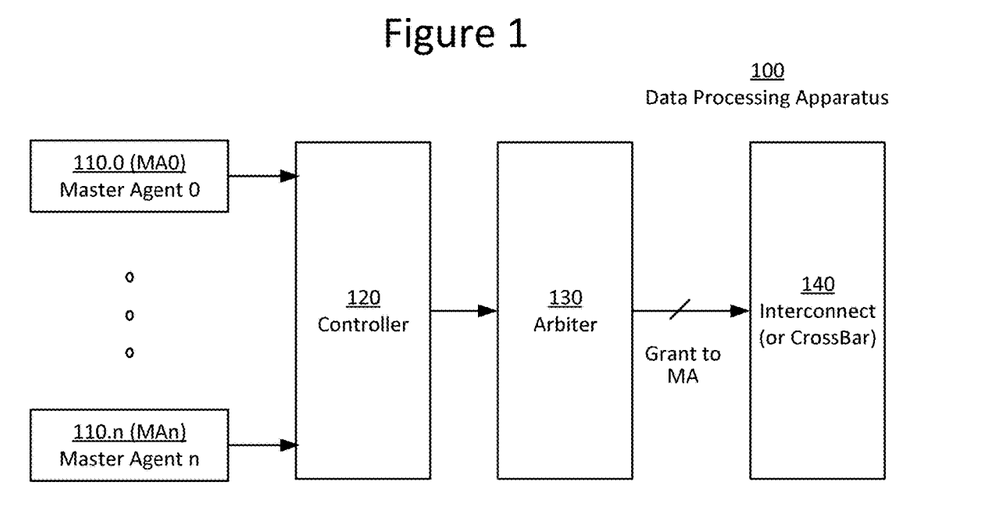
FIG. 1 illustrates a data processing apparatus in accordance with aspects of the disclosure.

FIG. 1 illustrates a data processing apparatus 100 in accordance with aspects of the disclosure.

The data processing apparatus 100 comprises a plurality of master agents (MAs) 110 (110.0 . . . 110.$n$), a controller 120, an arbiter 130, and a system interconnect 140. A system interconnect may be as a multi-master interconnect where master agents share a bus, or a crossbar interconnect where master agents share a connected resource.

The system interconnect 140 may be occupied by only one master agent 110 at a time. Master agents 110 request interconnect access via interconnect access requests. The arbiter 130 is configured to perform master agent arbitration among the interconnect access requests, and then signal a grant to the master agent 110 that wins the arbitration. The winning master agent 110 will be the next master agent 110 with interconnect access rights.

The controller 120 is configured to distribute interconnect bandwidth among the master agents 110 coupled thereto. More specifically, the controller 120 is configured to allocate to each of the master agents 110 a respective portion of the interconnect bandwidth within a time interval. The controller 120 is also configured to monitor the master agents 110 to determine if any of the master agents 110 has consumed its allocated portion of interconnect bandwidth within a current time interval. If a master agent 110 has consumed its allocated portion of interconnect bandwidth within the current time interval, the controller 120 is configured to delay any new access requests from this master agent 110 for a predetermined request delay time within the current time interval before forwarding any new access requests from this master agent 110 to the arbiter 130 for master agent arbitration.

The allocated portion of interconnect bandwidth is allocated time during which the respective master agent 110 may occupy the interconnect 140, including wait states. For each connected master agent 110, allocated bandwidth is a number of local interconnect clock cycles the master agent 110 may occupy the interconnect 140, or in the case of a crossbar interconnect, an addressed slave agent connection. During this time, the interconnect 140 cannot be occupied by another master agent 110.

Figure 2A:
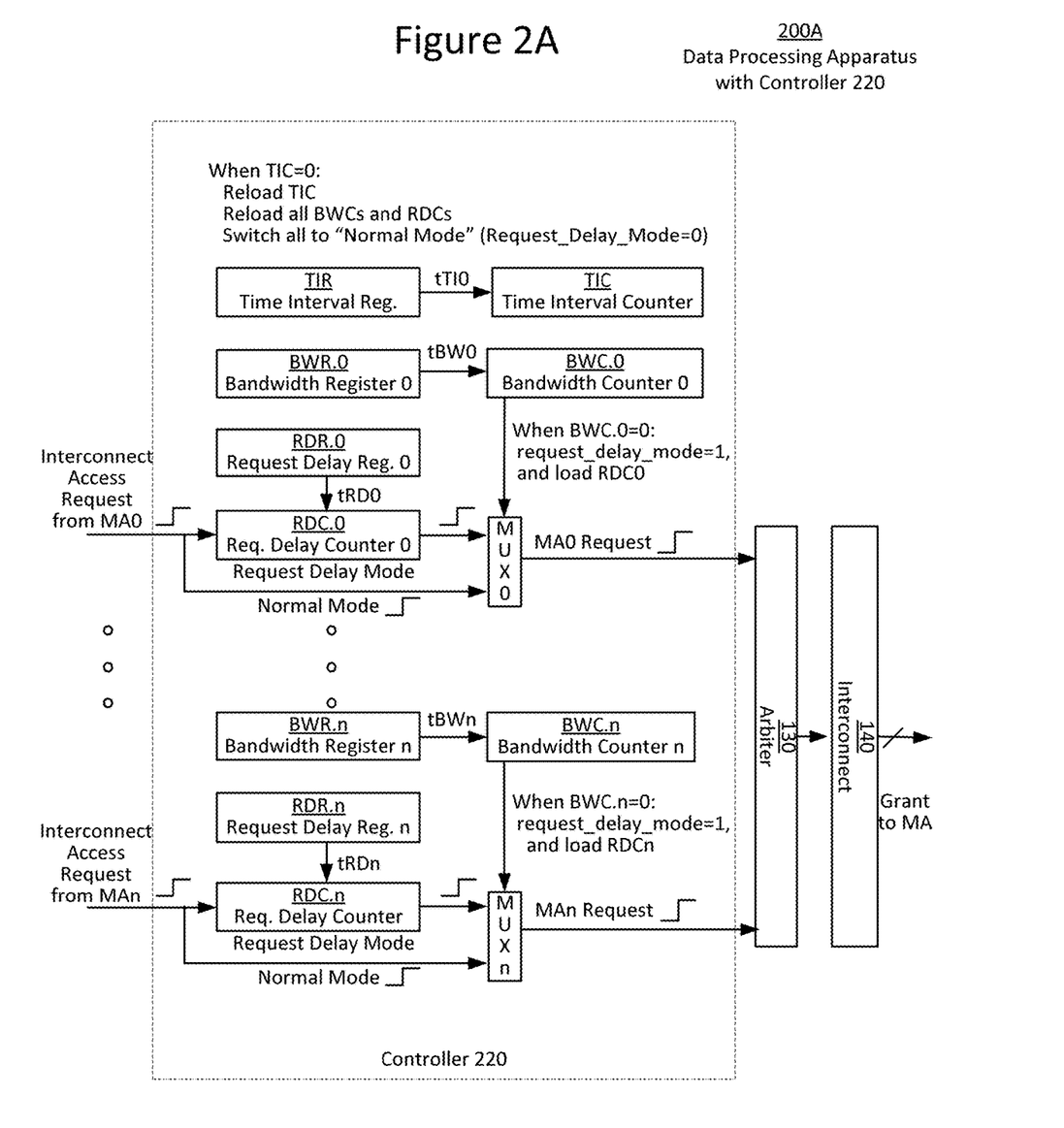
FIG. 2A illustrates a controller of the data processing apparatus of FIG. 1 in accordance with aspects of the disclosure.
Figure 2B:
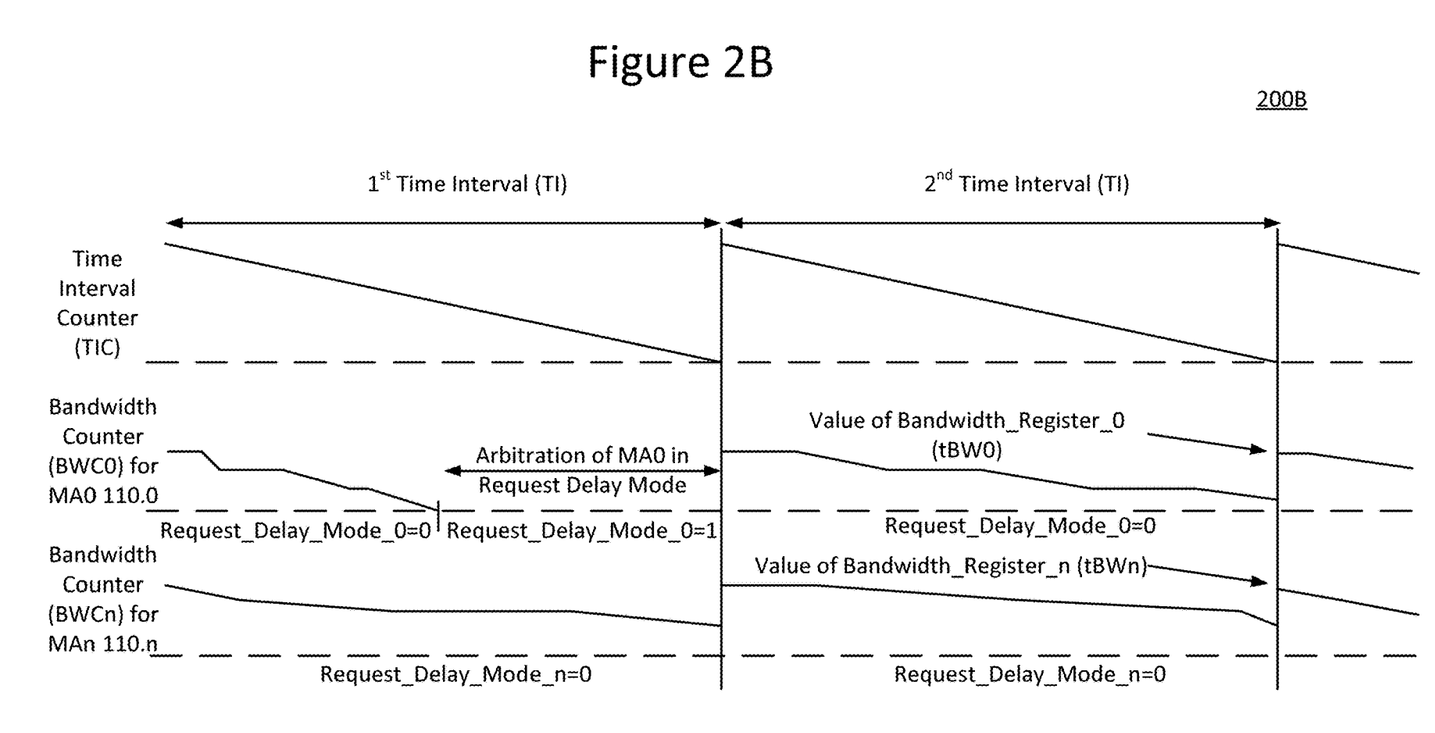
FIG. 2B illustrates a timing diagram corresponding with the controller of FIG. 2A.

FIG. 2A illustrates a controller 220 of the data processing apparatus 100 of FIG. 1 in accordance with aspects of the disclosure, and FIG. 2B illustrates a corresponding timing diagram 200B. The controller 220 corresponds with the controller 120 of FIG. 1.

The controller 220 comprises a time interval register TIR and a time interval counter TIC. The controller 220 also comprises, for each of the master agents 110 (110.0 . . . 110.$n$), a bandwidth register BWR (BWR.0., BWR.n), a bandwidth counter BWC (BWC.0., BWC.n), a request delay register RDR (RDR.0., RDRn), a request delay counter RDC (RDC.0., RDC.n), and a multiplexor MUX (MUX0 . . . MUXn).

The time interval register TIR is configured to store a time interval value tri. The time interval counter TIC is configured to receive, at the beginning of the time interval TI the time interval value tri from the time interval register TIR, and count a number of time segments corresponding with the time interval value $t_{TI}$. The time interval TI is configurable and may be applicable to a plurality of interconnects 140.

The bandwidth register BWR is configured to store a respective bandwidth value $t_{BW}$. The bandwidth counter BWC is configured to receive from the respective bandwidth register BWR the respective bandwidth value $t_{BW}$, and count a respective portion of the interconnect bandwidth within the current time interval TI consumed by the respective master agent 110.

The request delay register RDR is configured to store a respective predetermined request delay time value $t_{RD}$. The request delay counter RDC is configured to receive from the respective request delay register RDR the respective predetermined request delay time value $t_{RD}$, and count a number of time segments corresponding with the respective request delay time value $t_{RD}$ until either the respective predetermined request delay time or until the end of the current time interval TI, whichever is shorter.

The multiplexer MUX is configured to receive a select signal from the bandwidth counter BWC. When the bandwidth counter BWC is not 0, the select signal causes the multiplexer MUX to select normal mode, during which interconnect access requests from the master agent 110 are forwarded to the arbiter 130 for master agent arbitration without delay. On the other hand, after the bandwidth counter BWC has counted down to 0, the select signal causes the multiplexer MUX to select request delay counter RDC for the request delay mode, during which interconnect access requests from the master agent 110 are delayed before being forwarded to the arbiter 130 for master agent arbitration.

The time interval TI, the allocated portions of interconnect bandwidth $t_{BW}$, and the predetermined request delay time $t_{RD}$ are defined in terms of local interconnect clock cycles, which are the time segments. The disclosure is not limited to the time segments being clock cycles, but may be any time segment as suitable.

The operation of the controller 220 will now be described with reference to the timing diagram 200B of FIG. 2B. The upper portion of the timing diagram 200B illustrates the time interval TI and time interval counter TIC. The middle portion of the timing diagram 200B illustrates the bandwidth and bandwidth counter BWC0 for master agent 110.0, and the lower portion of the timing diagram 200B illustrates the bandwidth and bandwidth counter BWCn for master agent 110.n.

The time interval value tri is loaded from the time interval register TIR to the time interval counter TIC at the beginning of each time interval TI. The time interval counter TIC then counts down a number of time segments (e.g., interconnect clock cycles) corresponding with the time interval value tri. The time interval TI ends after the number of time segments corresponding with the time interval value tri have been counted down to 0. At the end of each time interval TI, corresponding with the beginning of the next time interval TI, the time interval value tri is reloaded from the time interval register TIR to the time interval counter TIC.

The controller 220 is configured to allocate to each of the master agents 110 a respective portion of the interconnect bandwidth within the time interval TI. At the beginning of the time interval TI, and for each of the master agents 110.0, 110.n, the controller 220 is configured to load the respective bandwidth value $t_{BW}$ from the respective bandwidth register BWR into the respective bandwidth counter BWC, and the respective predetermined request delay time value $t_{RD}$ from the respective request delay register RDR into the respective request delay counter RDC. The predetermined request delay time value $t_{RD}$ is also loaded in response to a new access request from the respective master agent 110.0, 110.n.

The timing diagram 200B shows the master agent 110.0 having consumed its allocated portion of interconnect bandwidth within the first time interval TI. The master agent 110.0 thus enters request delay mode (request_delay_mode_0=1). The controller 220 is configured to then delay any new access requests from this master agent 110.0 for the predetermined request delay time $t_{RD}$ within the first time interval TI before forwarding the new access requests from this master agent 110.0 to the arbiter 130 for master agent arbitration. The request delay counter RDC0 counts down a number of time segments corresponding with the respective request delay time value $t_{RD}$ until either the respective predetermined request delay time or until the end of the first time interval TI, whichever occurs first. After the end of respective predetermined request delay time $t_{RD}$ or the end of the first time interval TI, the new access request is forwarded to the arbiter 130. Since the maser agent 110.0 has consumed its allocated portion of interconnect bandwidth within the first time interval TI, if it wants additional bandwidth during this first time interval TI, this master agent 110 must wait for other master agents 110 have a chance to use bandwidth. But if no other master agent 110 needs bandwidth, then after the request delay, the master agent 110.0 can then again get a chance to access the interconnect 140.

If a master agent 110 has not consumed its allocated portion of interconnect bandwidth within the current time interval TI, such as the case with master agent 110.n during the first time interval TI, the controller 120 is configured to forward any new access requests from this master agent 110 to the arbiter 130 without delay. If this is a master agent 110 that has priority, the master agent 110 will likely immediately receive a grant and can start with the requested interconnect access as soon as the interconnect 140 is free.

By way of example, the application software may set the time interval TI to be 100,000 interconnect clock cycles, and allocates a master agent 110 with 30,000 interconnect clock cycles of the available 100,000 interconnect clock cycles. Whenever the master agent 110 has its access request granted and is executing a transaction on the interconnect, the bandwidth counter BWC0 counts down a number of interconnect clock cycles during which the master agent 110 occupies the interconnect, including data transfers and wait states. If the master agent 110 is reading from a slave agent that is inserting wait states because the slave agent needs three clock cycles to read the data from an internal memory and then transfer the data, each read access consumes four interconnect clock cycles of the master agent 110's bandwidth, but transfers only a single data bit. In other words, bandwidth represents interconnect clock cycles during transactions of the master agent 110.0, not the amount of data transferred.

After the master agent 110 has used its allocated bandwidth (30,000 interconnect clock cycles) as indicated by the bandwidth counter BWC0 counting down to 0, the master agent 110 enters the request delay mode (Request_Delay_Mode_0 changes from 0 to 1). The delay register value $t_{DR}$ is loaded into the delay counter DC, and the delay counter DC counts down in interconnect clock cycles to 0 for as long as the time interval counter TIC is greater than 0. Any new interconnect access request during the current time interval TI is delayed by, for example, 500 interconnect clock cycles, before the access request is forwarded to the arbiter 130 for master agent arbitration If a master agent 110 that has consumed its allocated bandwidth sends an interconnect access request towards the end of the time interval TI, such as when there is 400 interconnect clock cycles before the end of the time interval TI and the request delay is configured for interconnect 500 interconnect clock cycles, then the end of the current time interval TI occurs before the end of the request delay. At the end of the time interval TI, the bandwidth counter BWC0 is then reloaded from the bandwidth register BWR with the bandwidth value $t_{BW}$ of 30,000 interconnect clock cycles. Also, the request delay mode is switched off (request_delay_mode=0) switching the multiplexor MUX to the normal mode, and then new interconnect access requests are forwarded to the arbiter 130 without delay.

The time interval counter (TIC), bandwidth counter BWC, and request delay counter RDC (RDC.0 .... RDC.n) are described herein as counting down. Also, the request delay mode bit is set to 0 when there is no request delay mode (i.e., normal mode), and 1 otherwise. Of course these and other similar aspects of the disclosure are merely design choices. The disclosure is not limited in these respects.

Figure 3A:
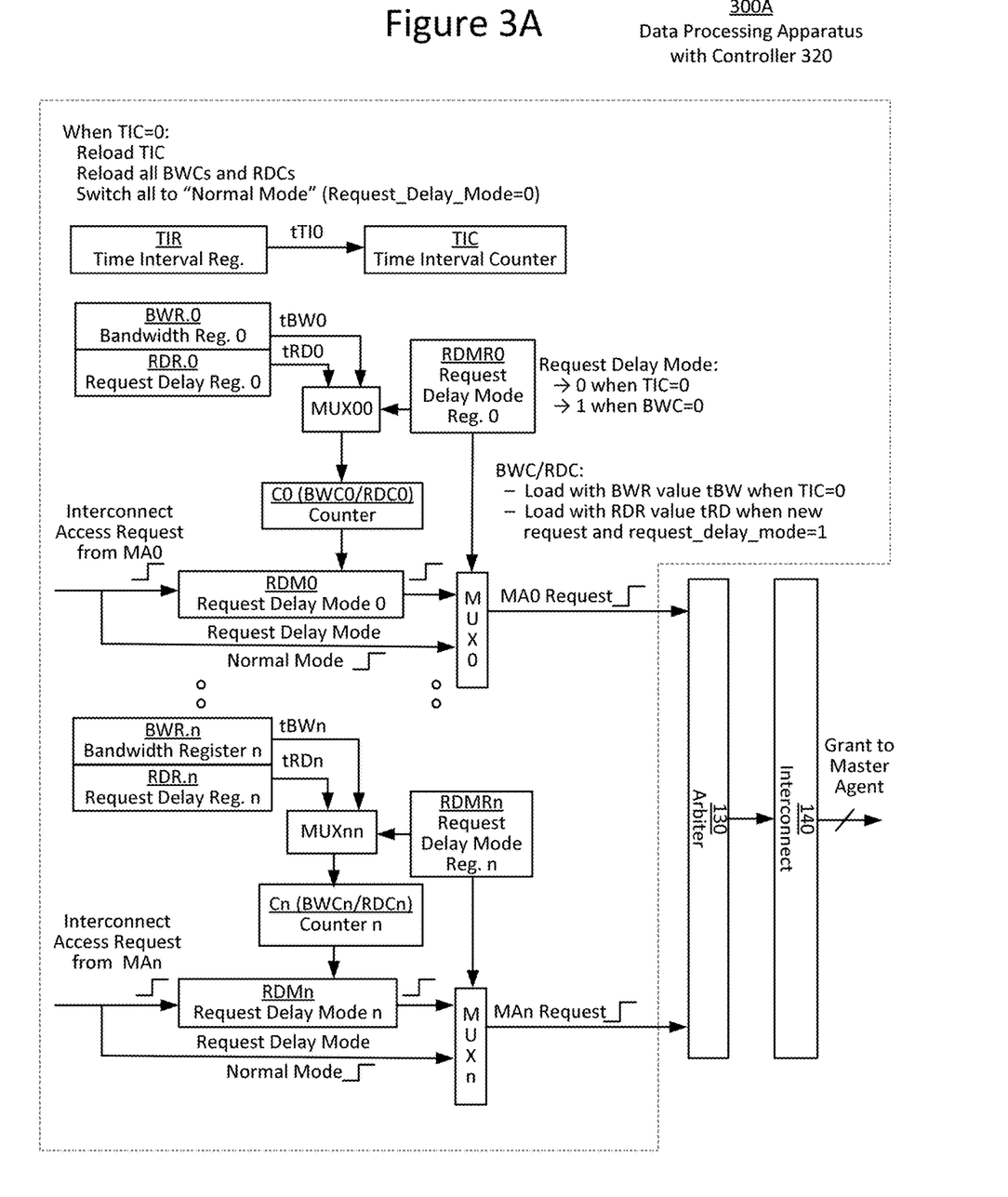
FIG. 3A illustrates a controller of the data processing apparatus of FIG. 1 in accordance with aspects of the disclosure.
Figure 3B:
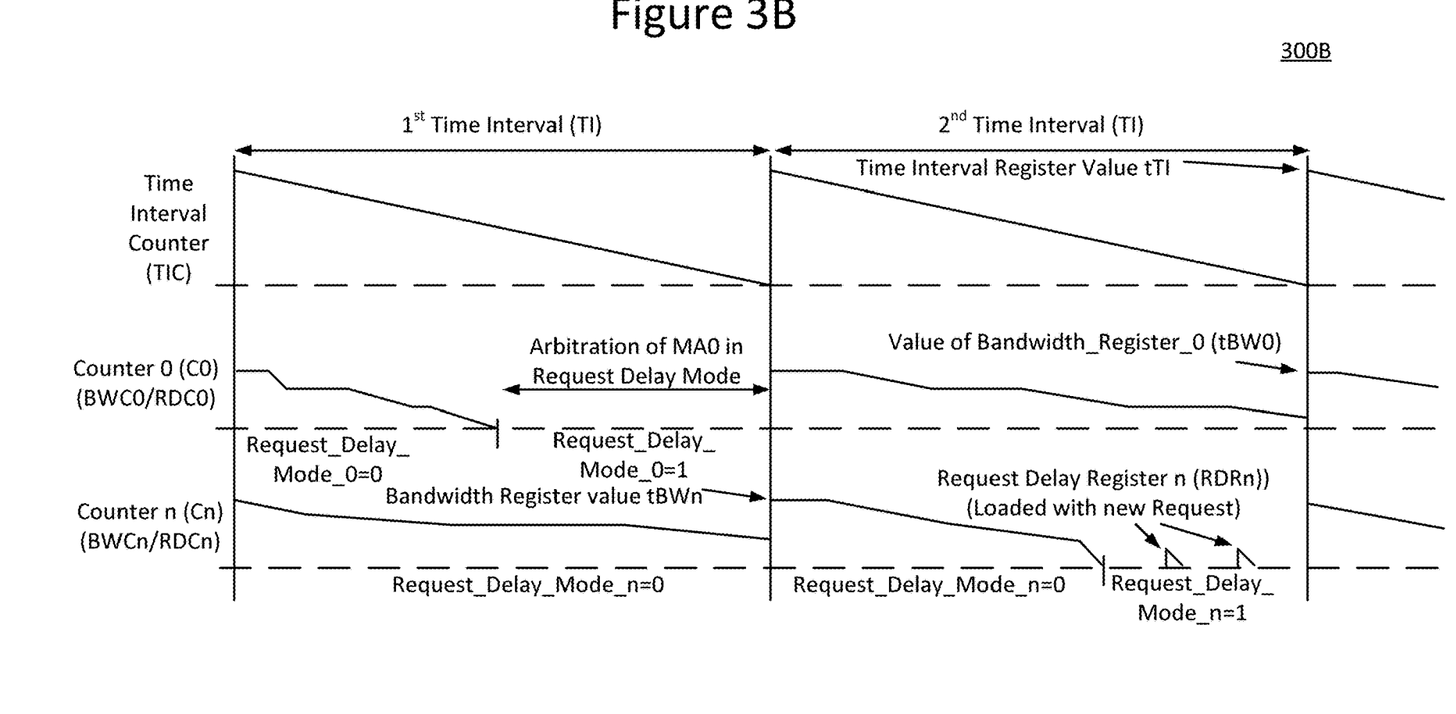
FIG. 3B illustrates a timing diagram corresponding with the controller of FIG. 3A.

FIG. 3A illustrates a controller 320 of the data processing apparatus 100 of FIG. 1 in accordance with aspects of the disclosure, and FIG. 3B illustrates a corresponding timing diagram 300B. The controller 320 corresponds with the controller 120 of FIG. 1.

The controller 320 is similar to the controller 220 of FIG. 2A in that it comprises a time interval register TIR, a time interval counter TIC, and for each master agents 110, a respective bandwidth register BWR configured to store a respective bandwidth value $t_{BW}$, a respective request delay register RDR configured to store a respective predetermined request delay time value $t_{RD}$, and a respective multiplexor MUX.

However, the controller 320 differs from controller 220 is that rather than having a separate bandwidth counter BWC and request delay counter RDC, the controller 320 comprises a single counter C (C0 . . . Cn) that functions as a bandwidth counter BWC or a request delay counter RDC, depending on whether or not the master agent 110 is in the request delay mode. The controller 320 also comprises a request delay mode register RDMR (RDMR0 . . . RDMEn), and an additional multiplexer MUX (MUX00 . . . . MUXnn).

The multiplexer MUX controls, in accordance with a select signal from the request delay mode register RDMR, whether the counter C is operating as a bandwidth counter BWC or a request delay counter RDC. When the master agent 110 begins the normal mode (TIC=0), the multiplexer MUX is configured by the value from the request delay mode register RDMR (RDMR value=0) to select and send to the counter C the bandwidth value $t_{BW}$ from the bandwidth register BWR. On the other hand, when the master agent 110 begins the request delay mode (BWC=0 and TIC>0) and sends a new interconnect access request, the multiplexer MUX is configured by the value from the request delay mode register RDMR (RDMR value=1) to select and send to the counter C the request delay value $t_{RD}$ from the request delay register RDR.

The timing diagram 300B of FIG. 3B shows counter Cn of the master agent 110.$n$ functioning as a bandwidth counter BWCn and then as a request delay counter RDCn. The counter Cn functions as a bandwidth counter BWCn during the first time interval TI, and also during a first portion of the second time interval TI. The counter Cn then functions as a request delay counter RDCn during a second portion of the second time interval TI. More specifically, after the counter C as the bandwidth counter BWC counts down from the bandwidth value town to zero, the master agent 110.$n$ enters the request delay mode (request_delay_mode_n=1), during which the counter C is loaded with the request delay value $t_{RDn}$ and functions as a request delay counter RDCn. The master agent 110.$n$ is shown during this request delay mode as sending two new interconnect access requests, which are delayed rather than being forwarded to the arbiter 130 for master agent arbitration. Each of these new interconnect access request causes the counter C to be loaded with the request delay value $t_{RDn}$, and the counter C counts down from the request delay value $t_{RDn}$ to zero, after which the new request may be forwarded to the arbiter 130 for master agent arbitration. Then at the end of the second time interval TI the request delay mode also ends, so the counter Cn is reloaded with the bandwidth value $t_{BWn}$.

An alternative way to delay an interconnect access request for each of the controller 220 and controller 320, is with a pair of first and second delay registers. A first delay register is configured to store a new interconnect access request from a master agent 110 that has consumed all of its allocated interconnect bandwidth within a time interval TI, and a request delay counter RDC is loaded with a request delay value $t_{RD}$. When the request delay counter RDC is counted down to 0, the interconnect access request is copied from the first delay register to a second delay register, and the content of the first delay register is deleted. The access request from the master agent 110 is not arbitrated as long as the interconnect access request is stored in the first or second delay register.

Figure 4:
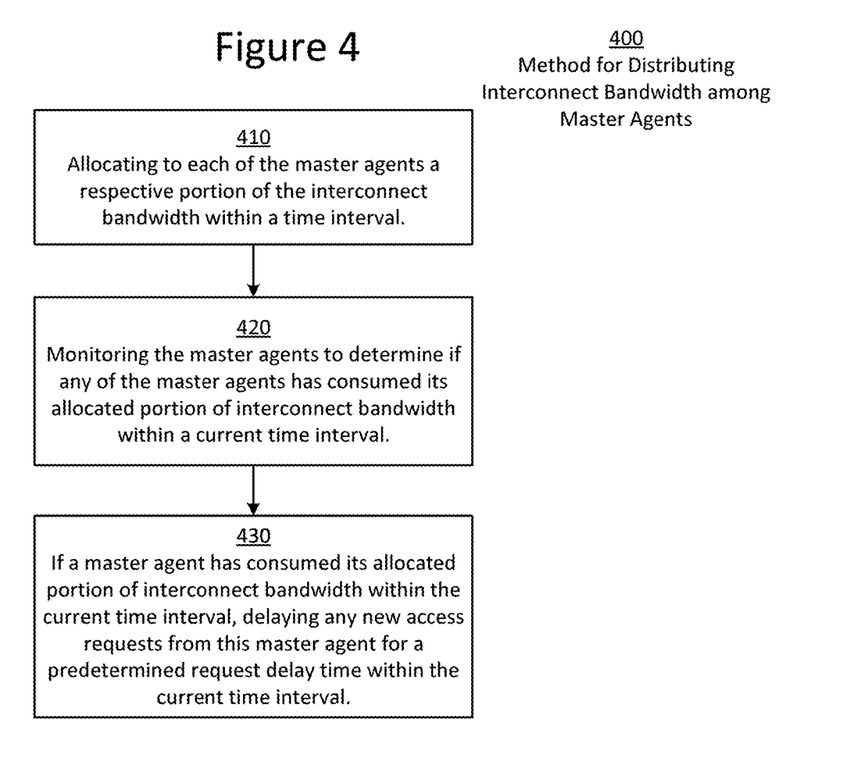
FIG. 4 illustrates a flowchart of a method for distributing interconnect bandwidth among master agents in accordance with aspects of the disclosure.

FIG. 4 illustrates a flowchart 400 of a method for distributing interconnect bandwidth among master agents 110 in accordance with aspects of the disclosure.

In Step 410, the controller 120/220/320 allocates to each of the master agents 110 a respective portion of the interconnect bandwidth within a time interval TI.

In Step 420, the controller 120/220/320 monitors the master agents 110 to determine if any of the master agents 110 has consumed its allocated portion of interconnect bandwidth within a current time interval TI.

In Step 440, if a master agent 110 has consumed its allocated portion of interconnect bandwidth within the current time interval TI, the controller 120/220/320 delays any new access requests from this master agent 110 for a predetermined request delay time $t_{RD}$ within the current time interval TI.

The aspects of this disclosure solve problems involving Quality-of-Service (QOS) for system interconnects with hard real-time requirements. Master agent interconnect access requests do not occur simultaneously, but sequentially. A master agent might thus be slowed down by another master agent which was arbitrated shortly prior. It is not acceptable to stop a master agent completely. Aspects of this disclosure do not change priority of a master agent, but instead delay its interconnect access request to reduce its interference until the end of a time interval. This results in improved bandwidth allocation for system interconnects, which may be configured separately or globally.

The techniques of this disclosure may also be described in the following examples.

Example 1. A method for distributing interconnect bandwidth among master agents, the method comprising: allocating to each of the master agents a respective portion of the interconnect bandwidth within a time interval; monitoring the master agents to determine if any of the master agents has consumed its allocated portion of interconnect bandwidth within a current time interval; and if a master agent has consumed its allocated portion of interconnect bandwidth within the current time interval, delaying any new access requests from this master agent for a predetermined request delay time within the current time interval.

Example 2. The method of example 1, wherein the time interval is configurable and is defined in terms of local interconnect clock cycles.

Example 3. The method of example 2, wherein the time interval applies to a plurality of interconnects.

Example 4. The method of example 1, further comprising: if a master agent has not consumed its allocated portion of interconnect bandwidth within the current time interval, forwarding any new access requests without delay from this master agent to an arbiter configured to perform master agent arbitration.

Example 5. The method of example 1, wherein the allocating step comprises: for each of the master agents, loading a respective bandwidth value from a respective bandwidth register into a respective bandwidth counter.

Example 6. The method of example 5, wherein the loading of the respective bandwidth values is performed at the beginning of the time interval.

Example 7. The method of example 1, wherein the monitoring comprises: for each of the master agents, counting, by a respective counter, a respective portion of the interconnect bandwidth consumed by the respective master agent within the current time interval.

Example 8. The method of example 7, wherein the interconnect bandwidth is defined in terms of local interconnect clock cycles.

Example 9. The method of example 7, wherein for each of the master agents, the delaying comprises: loading a respective predetermined request delay time value from a respective request delay register into the same respective counter previously used to count the respective portion of the interconnect bandwidth consumed by the respective master agent within the current time interval; and counting, by the respective counter, a number of time segments corresponding with the respective request delay time value until either the respective predetermined request delay time or until the end of the current time interval, whichever occurs first.

Example 10. The method of example 1, further comprising: for each of the master agents, loading a respective predetermined request delay time value from a respective delay register into a respective request delay counter.

Example 11. The method of example 10, wherein the loading occurs at the beginning of the time interval.

Example 12. The method of example 10, wherein for each of the master agents, the loading occurs in response to a new access request from the respective master agent.

Example 13. The method of example 12, further comprising: counting, by the respective request delay counter, a number of time segments corresponding with the respective request delay time value until either the respective predetermined request delay time or until the end of the current time interval, whichever occurs first.

Example 14. The method of example 13, further comprising: after the end of respective predetermined request delay time or the end of the current time interval, forwarding the new access request to an arbiter configured to perform master agent arbitration.

Example 15. The method of example 1, further comprising: loading, at the beginning of the time interval, a time interval value from a time interval register to a time interval counter; and counting, by the time interval counter, a number of time segments corresponding with the time interval value; and after the number of time segments corresponding with the time interval value have been counted, reloading the time interval value from the time interval register to the time interval counter.

Example 16. The method of example 1, wherein the time interval, the allocated portions of interconnect bandwidth, and the predetermined request delay time are defined in terms of clock cycles.

Example 17. The method of example 1, wherein the allocated portion of interconnect bandwidth is defined as allocated time during which the respective master agent may occupy the interconnect.

Example 18. A data processing apparatus, comprising: an interconnect; master agents coupled to the interconnect; and a controller configured to distribute interconnect bandwidth among the master agents, the controller configured to: allocate to each of the master agents a respective portion of the interconnect bandwidth within a time interval; monitor the master agents to determine if any of the master agents has consumed its allocated portion of interconnect bandwidth within a current time interval; and if a master agent has consumed its allocated portion of interconnect bandwidth within the current time interval, delay any new access requests from this master agent for a predetermined request delay time within the current time interval.

Example 19. The data processing apparatus of example 18, wherein the time interval is configurable and is defined in terms of local interconnect clock cycles.

Example 20. The data processing apparatus of example 18, wherein the time interval applies to a plurality of interconnects.

Example 21. The data processing apparatus of example 18, further comprising, for each of the master agents: a respective bandwidth register configured to store a respective bandwidth value; and a respective bandwidth counter configured to receive from the respective bandwidth register the respective bandwidth value, and count a respective portion of the interconnect bandwidth within the current time interval consumed by the respective master agent.

Example 22. The data processing apparatus of example 18, wherein the interconnect bandwidth is defined in terms of local interconnect clock cycles.

Example 23. The data processing apparatus of example 18, further comprising, for each of the master agents: a respective request delay register configured to store a respective predetermined request delay time value; and a respective request delay counter configured to receive from the respective request delay register the respective predetermined request delay time value, and count a number of time segments corresponding with the respective request delay time value until either the respective predetermined request delay time or until the end of the current time interval, whichever is shorter.

Example 24. The data processing apparatus of example 18, further comprising, for each of the master agents: a respective bandwidth register configured to store a respective bandwidth value; a respective request delay register configured to store a respective predetermined request delay time value; and a respective counter configured to receive from the respective bandwidth register the respective bandwidth value, count a respective portion of the interconnect bandwidth within the current time interval consumed by the respective master agent, receive from the respective delay register the respective predetermined request delay time value, and count a number of time segments corresponding with the respective request delay time value until the respective delay or until the end of the current time interval, whichever occurs first.

Example 25. The data processing apparatus of example 18, further comprising: a time interval register configured to store a time interval value; and a time interval counter configured to receive, at the beginning of the time interval the time interval value from the time interval register, count a number of time segments corresponding with the time interval value, and after the number of time segments corresponding with the time interval value have been counted, again receive the time interval value from the time interval register.

Example 26. The data processing apparatus of example 18, wherein the allocated portion of interconnect bandwidth is defined as allocated time during which the respective master agent may occupy the interconnect.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A method for distributing interconnect bandwidth among master agents, the method comprising:
   allocating to each of the master agents a respective amount of the interconnect bandwidth within a time interval, wherein each of the master agents has a potential to consume its respective allocated amount of the interconnect bandwidth at any time throughout the time interval;
   monitoring the master agents to determine if any of the master agents has consumed its allocated amount of interconnect bandwidth within a current time interval; and
   multiplexing between a normal mode and request delay mode, wherein when a master agent has consumed its allocated amount of interconnect bandwidth within the current time interval, selecting, in response to this consumption, to the request delay mode to delay any new access requests from this master agent for a predetermined request delay time within the current time interval before forwarding the new access requests to an arbiter configured to perform master agent arbitration.

2. The method of claim 1, wherein the time interval is configurable and is defined in terms of local interconnect clock cycles.

3. The method of claim 2, wherein the time interval applies to a plurality of interconnects.

4. The method of claim 1, further comprising:
   if a master agent has not consumed its allocated amount of interconnect bandwidth within the current time interval, forwarding any new access requests without delay from this master agent to the arbiter configured to perform master agent arbitration.

5. The method of claim 1, wherein the allocating step comprises:
   for each of the master agents, loading a respective bandwidth value from a respective bandwidth register into a respective bandwidth counter.

6. The method of claim 5, wherein the loading of the respective bandwidth values is performed at the beginning of the time interval.

7. The method of claim 1, wherein the monitoring comprises:
   for each of the master agents, counting, by a respective counter, a respective amount of the interconnect bandwidth consumed by the respective master agent within the current time interval.

8. The method of claim 7, wherein the interconnect bandwidth is defined in terms of local interconnect clock cycles.

9. The method of claim 7, wherein for each of the master agents, the delaying comprises:
   loading a respective predetermined request delay time value from a respective request delay register into the same respective counter previously used to count the respective amount of the interconnect bandwidth consumed by the respective master agent within the current time interval; and
   counting, by the respective counter, a number of time segments corresponding with the respective request delay time value until either the respective predetermined request delay time or until the end of the current time interval, whichever occurs first.

10. The method of claim 1, further comprising:
    for each of the master agents, loading a respective predetermined request delay time value from a respective request delay register into a respective request delay counter.

11. The method of claim 10, wherein the loading occurs at the beginning of the time interval.

12. The method of claim 10, wherein for each of the master agents, the loading occurs in response to a new access request from the respective master agent.

13. The method of claim 12, further comprising:
    counting, by the respective request delay counter, a number of time segments corresponding with the respective request delay time value until either the respective predetermined request delay time or until the end of the current time interval, whichever occurs first.

14. The method of claim 13, further comprising:
    after the end of respective predetermined request delay time or the end of the current time interval, forwarding the new access request to the arbiter configured to perform master agent arbitration.

15. The method of claim 1, further comprising:
    loading, at the beginning of the time interval, a time interval value from a time interval register to a time interval counter; and
    counting, by the time interval counter, a number of time segments corresponding with the time interval value; and
    after the number of time segments corresponding with the time interval value have been counted, reloading the time interval value from the time interval register to the time interval counter.

16. The method of claim 1, wherein the time interval, the allocated amounts of interconnect bandwidth, and the predetermined request delay time are defined in terms of clock cycles.

17. The method of claim 1, wherein the allocated amount of interconnect bandwidth is defined as allocated time during which the respective master agent may occupy the interconnect.

18. The method of claim 1, further comprising:
    if a master agent has consumed its allocated amount of interconnect bandwidth within the current time interval, delaying any new access requests from this master agent for the shorter of the predetermined request delay time and the end of the current time interval.

19. The method of claim 1, wherein more than one of the master agents consumes at least an amount of its respective allocated amount of interconnect bandwidth within the current time interval.

20. The method of claim 1, wherein when the master agent has consumed its allocated amount of interconnect bandwidth within the current time interval, then after the predetermined request delay time within the current time interval, if no other master agent needs to consume interconnect bandwidth, the master agent has a potential to consume an additional amount of the interconnect bandwidth within the current time interval.

21. A data processing apparatus, comprising:
    master agents coupled to an interconnect; and
    a controller, coupled between the master agents and the interconnect, and configured to distribute interconnect bandwidth among the master agents, the controller configured to:

allocate to each of the master agents a respective amount of the interconnect bandwidth within a time interval, wherein each of the master agents has a potential to consume its respective allocated amount of the interconnect bandwidth at any time throughout the time interval;

monitor the master agents to determine if any of the master agents has consumed its allocated amount of interconnect bandwidth within a current time interval; and multiplex between a normal mode and request delay mode, wherein when a master agent has consumed its allocated amount of interconnect bandwidth within the current time interval, select, in response to this consumption, to the request delay mode to delay any new access requests from this master agent for a predetermined request delay time within the current time interval before forwarding the new access requests to an arbiter configured to perform master agent arbitration.

22. The data processing apparatus of claim 21, wherein the time interval is configurable and is defined in terms of local interconnect clock cycles.

23. The data processing apparatus of claim 21, wherein the time interval applies to a plurality of interconnects.

24. The data processing apparatus of claim 21, further comprising, for each of the master agents:
a respective bandwidth register configured to store a respective bandwidth value; and
a respective bandwidth counter configured to receive from the respective bandwidth register the respective bandwidth value, and count a respective amount of the interconnect bandwidth within the current time interval consumed by the respective master agent.

25. The data processing apparatus of claim 21, wherein the interconnect bandwidth is defined in terms of local interconnect clock cycles.

26. The data processing apparatus of claim 21, further comprising, for each of the master agents:
a respective request delay register configured to store a respective predetermined request delay time value; and
a respective request delay counter configured to receive from the respective request delay register the respective predetermined request delay time value, and count a number of time segments corresponding with the respective request delay time value until either the respective predetermined request delay time or until the end of the current time interval, whichever is shorter.

27. The data processing apparatus of claim 21, further comprising, for each of the master agents:
a respective bandwidth register configured to store a respective bandwidth value;
a respective request delay register configured to store a respective predetermined request delay time value; and
a respective counter configured to receive from the respective bandwidth register the respective bandwidth value, count a respective amount of the interconnect bandwidth within the current time interval consumed by the respective master agent, receive from the respective request delay register the respective predetermined request delay time value, and count a number of time segments corresponding with the respective request delay time value until the respective delay or until the end of the current time interval, whichever occurs first.

28. The data processing apparatus of claim 21, further comprising:
a time interval register configured to store a time interval value; and
a time interval counter configured to receive, at the beginning of the time interval the time interval value from the time interval register, count a number of time segments corresponding with the time interval value, and after the number of time segments corresponding with the time interval value have been counted, again receive the time interval value from the time interval register.

29. The data processing apparatus of claim 21, wherein the allocated amount of interconnect bandwidth is defined as allocated time during which the respective master agent may occupy the interconnect.

30. The data processing apparatus of claim 21, wherein if a master agent has consumed its allocated amount of interconnect bandwidth within the current time interval, delay any new access requests from this master agent for the shorter of the predetermined request delay time and the end of the current time interval.

31. The data processing apparatus of claim 21, wherein more than one of the master agents consumes at least an amount of its respective allocated amount of interconnect bandwidth within the current time interval.

32. The data processing apparatus of claim 21, wherein when the master agent has consumed its allocated amount of interconnect bandwidth within the current time interval, then after the predetermined request delay time within the current time interval, if no other master agent needs to consume interconnect bandwidth, the master agent has a potential to consume an additional amount of the interconnect bandwidth within the current time interval.

* * * * *